Patented Mar. 23, 1937

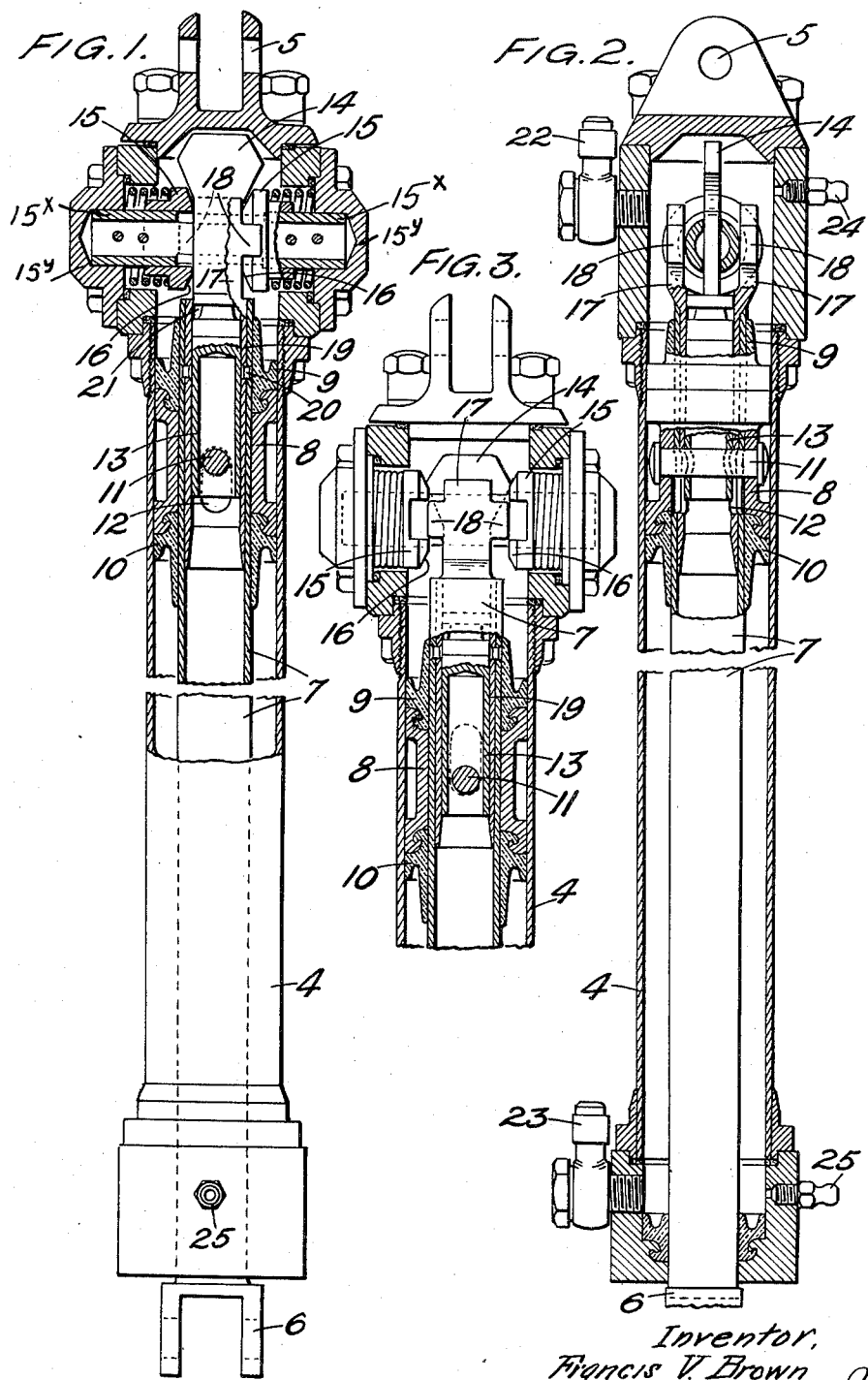

2,074,772

UNITED STATES PATENT OFFICE 2,074,772

LOCKING MEANS FOR FLUID PRESSURE MOTORS

Francis Victor Brown, London, England, assignor to Automotive Products Company Limited, London, England Application January 23, 1935, Serial No. 3,173
In Great Britain February 27, 1934

6 Claims. (Cl. 121—40)

This invention relates to fluid pressure jack or like devices, in which term is included hydraulic operative gear of telescopic or like nature, adapted to operate retractable aircraft undercarriages, lifting and lowering gear, aircraft controls, or indeed in any circumstances where the application of hydraulic pressure in two senses in a pipeline system is desired to be employed for motor purposes. The particular object of the present invention is to provide a jack of this sort which can be operated in either of two senses of direction according to the direction of applied fluid pressure, and which towards the end of its operative movement may automatically lock until reversal of operative pressure causes unlocking.

According to this invention and with the above objects in view, a jack comprises a piston in a cylinder interconnected with a locking device in such a way that the final part of the piston stroke towards one end of its movement may enable positive locking or retention of a piston rod part to occur, whilst the initial reverse movement of the piston, preferably relative to its rod, unlocks the piston rod. Actually the piston above referred to may be a composite element comprising essentially two pistons, one slightly movable relative to the other, or a single piston distortable so that its crown may move axially relative to its skirt, but preferably it is a double acting piston slidably mounted fluid tight on a piston rod, and capable of some slight degree of axial freedom on this rod. In this case the piston is mechanically connected with a key adapted to unlock or to separate spring loaded locking devices, which in their turn are adapted positively to engage and lock recesses of the piston rod. In this preferred construction it is essential that the piston should have sufficient lost motion in relation to the rod to enable its key to perform the required unlocking movements before the movement of the piston is transmitted to the piston rod. The nature of the invention may perhaps be better understood from the following description of one exemplary embodiment, which is in the form of a double acting hydraulic jack adapted to operate a retractable aircraft undercarriage.

In order that it may be clearly understood and more readily carried into effect, the invention is hereinafter described with reference to the accompanying diagrammatic drawing, in which:

Figure 1 is a vertical sectional view through a hydraulic jack constructed in accordance with the present invention, the parts being shown locked and the extensible element of the jack collapsed.

Figure 2 is a similar view with the parts in the same positions taken at right angles to Figure 1.

Figure 3 is a view similar to Figure 1, with the lower portion broken away, the parts being shown in the positions occupied when the extensible part of the jack is to be extended and following sufficient operation of the parts to release the lock to permit free extension of the movable part.

The drawing illustrates a jack element extendable by fluid means and which although particularly adapted for use in an aircraft retractable undercarriage may be equally applicable for other purposes. The jack is of the telescopic type and comprises a cylinder 4 adapted to be anchored pivotally, for example to a fuselage member; a pin-slotted lug 5 being provided in conjunction therewith to furnish the necessary attachment. A hollow or tubular piston rod 7 slidable within the cylinder has an outer end projecting through the casing and is provided with a pin-slotted lug 6 for attachment to an undercarriage part. The piston rod 7 has fast with it a double acting piston 8 the ends of which are sealed by means of cup leathers such as 9 and 10 providing a fluid-tight packing with the working surfaces of the rod 7 and casing 4. The piston 8 is connected to the rod 7 by a diametrally extending pin 11 operating in a somewhat elongated and axially directed slot 12 in the hollow rod. The pin 11 is connected directly with a key member 13 which extends from the rod 7 beyond the inner end thereof and comprises at its extending extremity a cam 14. In an end of the cylinder there is provided a locking device comprising two radially slidable plungers 15 inwardly spring pressed and furnished at their inner ends with inclined surfaces 16 adapted to cooperate with the cam part 14 of the key. The plungers 15 slide upon a through rod or support bar 15$x$ carried by housings 15$y$ provided at the appropriate end of the cylinder 4. Within and fast with the rod 7 is a fork-like extension 17 which is provided with extensions 18 preferably squared as shown to engage recesses in the plungers 15. The sleeve part 19 of the fork member 17 has been shown in the drawing made fast within the hollow rod 7 by means of the rivets 20, and it should here be mentioned that the slot 12 is formed through the sleeve part 19 as well as through the piston rod 7, should the construction be such that the sleeve 19 extends so far down the end of the rod 7. The cam part 14 of the key 13 extends between branches of the fork member 17 and through a slot in the support bar of the plungers 15. The key is provided with a suitable gland or packing within the bore of the piston rod as indicated at 21 to obviate leakage past it.

It may be mentioned that the arrangement of the parts is such that the key 13 and the piston 8 are fastened by the pin 11 to move as one, but on the other hand the pin 11 passes through the elongated slot 12 in the fork member 17 and the piston rod 7, which are also fastened together to move as one, and consequently lost motion is provided between the two fixed pairs of elements.

If the fluid pressure is applied below the cup leather 10, all parts will move in unison with the pin 11 at the top of the slot 12; the cam 14 separates the detents 15 enough to let the pieces 18 come into alignment with the apertures of the detents. By the time the pieces 18 are in line with the apertures in the detents the cam has begun to pass out from between the detents, allowing them to close and lock the jack. The point to be remembered is that whichever way the rod is going, the cam 14 actually precedes the fork 17 in entering between the detents; thus, at the end of the upstroke, the cam 14 and the piston move together with the pin 11 in the top of the slot 12, the whole assembly moving in unison, but for unlocking, the fork 17 and the rod do not move until the cam 14 has moved down to separate the detents, by which time the pin 11 reaches the bottom of the slot 12, as shown in Figure 3, and thereafter the assembly will move as one.

To insure opening of the lock, all that is necessary is that the cam 14 shall pass through and separate the detents, and thereby open the way for the fork 17. On the upstroke the fork 17 would not stand still because the pin 11 is already at the top of the slot 12 and is therefore dragging the parts 7 and 19 with it, the upper edge of the pin in this condition being in the position shown in Figures 1 and 2. Obviously, if the fork 17 hit an abutment while fluid pressure were being applied on the washer 10, the fork could not stop unless the piston 8 and cam 14 stopped as well, because the pin 11 being then at the top of the slot 12 cannot allow the fork and plunger assembly to move back relative to the assembly 13 and 8; in fact, the only movement which could be allowed between these two assemblies with the parts in the relationship shown in Figures 1 and 2 would be an attempt on the part of the assembly 7 and 19 to catch up with the cam and piston assembly until the bottom of the slot 12 was against the pin 11, but there is nothing to cause this catching-up motion to take place for the only motion which is transmitted to the assembly 7 and 19 is the drag of the pin 11 against the top end of the slot.

The operation is as follows: Assume the jack to be fully extended in the telescopic sense, pressure is applied to the outer cup leather 10 with the result that the piston 8 and its rod 7 move accordingly. Within an inch or so of the end of its inward travel the cam part 14 of the key 13 contacts with the inclined surfaces 16 of the plungers forcing them apart radially. The locking pins 18 of the fork member 17 cannot pass the plungers to enter the recesses therein until the cam 14 has forced the plungers apart, which operation has just been performed. The cam part 14 of the key 13 being fast with the piston 8 will allow movement of the cam to precede the fork member 17 until the pin 11 engages the leading end of the slot 12, whereupon movement of the piston 8 causes the fork member 17 to move on until the locking pins engage the recesses of the plungers 15 allowing them to return and lock the parts in their retracted relationship. Assuming that it is now desired to forcibly extend the elements, pressure applied to the cup leather 9 causes first of all the piston to slide along the piston rod an amount equal to the length of the slot 12. This initial movement brings the key through between the plungers 15, forcing them apart radially so that they disengage the pins 18, by which time the pin 11 will have reached the then leading edge of the slot 12, with the result that the extensible part of the assembly moves out under the influence of the pressure applied against the face of the cup washer 9.

Connecting nipples 22 and 23 are provided for the reception of pipe lines leading from a pump or fluid pressure generator which may be of any convenient kind. Plugs 24 and 25 may also be provided for bleeding of the system or drainage of the working fluid when required.

What I claim is:—

1. A jack including a cylinder, a rod telescopically movable therein, a double-acting annular piston on the rod slidable in the cylinder and to a limited extent with respect to the rod, a packing washer on each end of the piston bearing in a fluid-tight manner upon both the surface of the rod and the bore of the cylinder, locking means carried by the cylinder for locking the rod at an end of its stroke comprising detents carried by the cylinder and spring-pressed inwardly for engagement with a locking element on the rod, a cam projecting from the end of the rod moving as one with the piston but having lost motion therewith with respect to the rod, whereby said cam is able to pass through the detents to separate them and then allow them to close when the locking element on the rod has moved forward into alignment with said detents.

2. A jack including a cylinder, a rod telescopically movable therein, a double-acting annular piston on the rod slidable in the cylinder and to a limited extent with respect to the rod, a packing washer on each end of the piston bearing in a fluid-tight manner upon both the surface of the rod and the bore of the cylinder, locking means carried by the cylinder for locking the rod at an end of its stroke comprising detents carried by the cylinder and spring-pressed inwardly for engagement with a locking element on the rod, a cam projecting from a hollow in the end of the rod moving as one with the piston but having lost motion therewith with respect to the rod, whereby said cam is able to pass through the detents to separate them and then allow them to close when the locking element on the rod has moved forward into alignment with said detents.

3. A construction as defined in claim 1, wherein with the approach of the piston towards one end of a stroke the cam prepares the locking elements carried by the cylinder for the reception of the locking element of the rod and then releases them for locking, and movement of the piston in the opposite sense first separates the locking means carried by the cylinder, freeing the locking element of the rod, whereafter the piston and rod continue to move as one assembly.

4. A construction as defined in claim 2, wherein the locking element carried by the rod comprises a fork-like extension, the prongs of which flank the cam and are shaped for locking engagement with the detents, said fork-like extension being fixed axially in relation to the rod but movable therewith to a limited extent relative to the cam and piston.

5. A construction as defined in claim 1, in which the inner ends of the detents are engaged by the cam as it passes through to separate them present inclined surfaces to facilitate the sliding engagement with correspondingly inclined edges of the cam.

6. A construction as set forth in claim 1, wherein the limited movement between the annular piston and the rod is provided by a pin rigidly interconnecting the piston and the cooperating element carried by the rod, which pin passes through an elongated slot and is axially slidable therein within the limits of the slot.

FRANCIS VICTOR BROWN.